United States Patent [19]
Pont et al.

[11] 3,811,527
[45] May 21, 1974

[54] AIR-CUSHION VEHICLES

[75] Inventors: Dominique Pont, Garches; Andre Lafont, Coudoux; Alain Voisin, Velaux, all of France

[73] Assignee: Societe d'Etudes et de Developpement des Aeroglisseurs Marina Terrestres et Amphibies S.E.D.A.M., Paris, France

[22] Filed: Dec. 28, 1971

[21] Appl. No.: 212,930

[30] Foreign Application Priority Data
Dec. 31, 1970  France .................................. 70.47521
Dec. 16, 1971  France .................................. 71.45220

[52] U.S. Cl. ............................. 180/121, 180/117
[51] Int. Cl. .............................................. B60v 1/02
[58] Field of Search ........... 180/116, 117, 118, 119, 180/120, 121, 122, 123, 124, 125, 126, 127, 128, 129, 130

[56] References Cited
UNITED STATES PATENTS
3,268,022  8/1966  Gustafson ...................... 180/116
3,336,995  8/1967  Farb et al. ...................... 180/120
3,495,679  2/1970  Cockerell ....................... 180/118

FOREIGN PATENTS OR APPLICATIONS
1,541,013  10/1968  France ......................... 180/116
1,008,930  11/1965  Sweden ........................ 180/116

*Primary Examiner*—Kenneth H. Betts
*Assistant Examiner*—John A. Carroll
*Attorney, Agent, or Firm*—Alan H. Levine; Breitenfeld & Levine

[57] ABSTRACT

An air-cushion vehicle including a platform carrying means providing central lift compressed air cushion and peripheral cushions. The supply of compressed air to the central and peripheral cushions is effected through a diffusion space below the platform, the diffusion space being divided into sections, and the air pressure in each section being regulated. Concentration means, in the form of swivelling flaps, adjust the air flow to the various diffusion space sections. The peripheral cushions may be defined by a plurality of annular contiguous skirts, and there may be two groups of such skirts arranged at the front and rear or at port and starboard of the vehicle. The means for concentrating and distributing air pressure among the various diffusion space sections may be controlled by a single lever through a programmed memory system.

19 Claims, 19 Drawing Figures

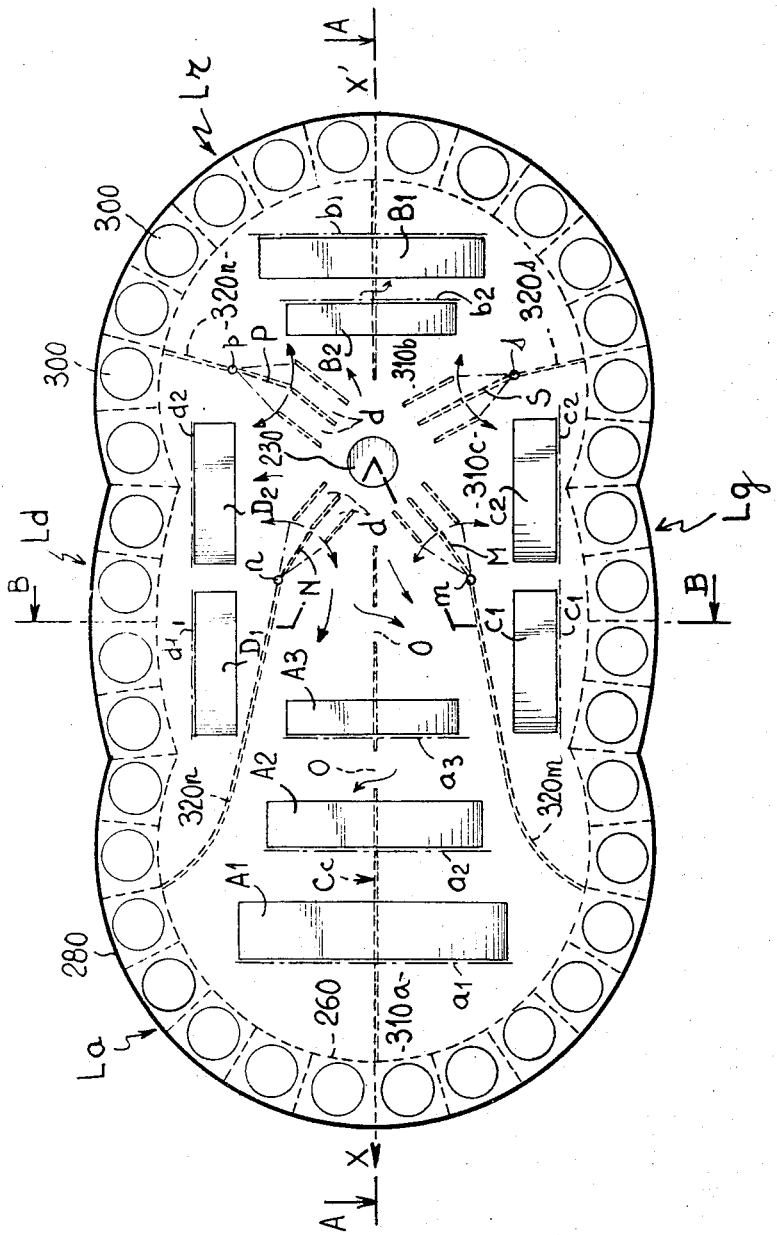

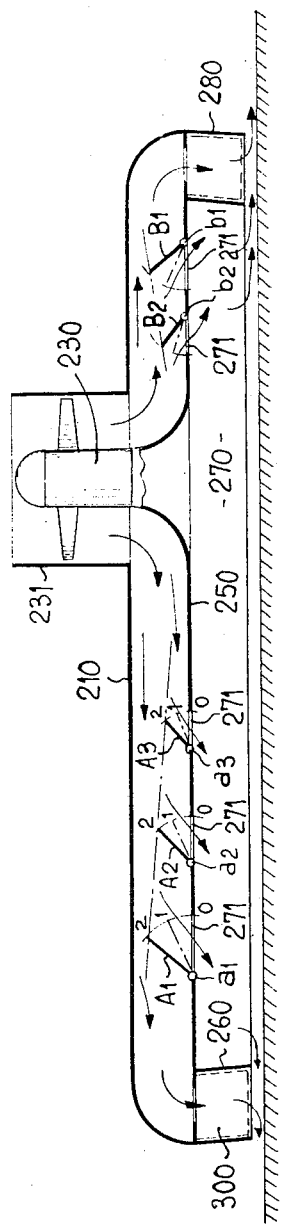
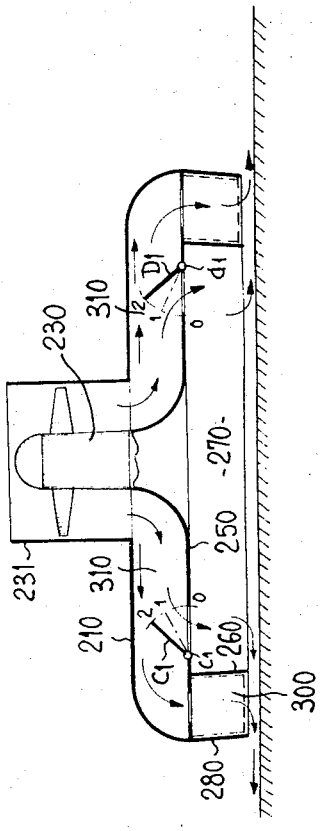

AIR-CUSHION VEHICLES

The present invention relates to an "air cushion" vehicle of the type in which the lift of a platform is effected by a plurality of air cushions, each cushion being delimited by flexible skirts interposed between the vehicle and the surface over which it moves, the air cushions comprising a central cushion and a series of cushions distributed around the central cushion to form a partitioned peripheral lift assembly.

As an example of a vehicle of this type mention may be made of that which is described in French Pat. No. 1,541,013 which shows a central cushion generally delimited by a main internal skirt, surrounded by a peripheral cushion, delimited by a main external skirt and the above-mentioned main internal skirt; the peripheral cushion is sub-divided into a certain number of elementary cushions delimited by a plurality of "satellite" skirts or "partition-skirts" arranged between the main internal skirt and the main external skirt.

The present invention relates essentially to new methods of execution and of supplying with air the central cushion and the peripheral assembly, with the essential aim of easily modifying the lift attitude of the vehicle, of shifting its thrust centre and of modifying its attitude rigidity.

According to a first aspect of the invention the supplying and the pressure of the central cushion and of certain areas of the peripheral assembly are differentially regulated. To do so, use is made, according to the invention on the one hand, of means of concentration making it possible to regulate differentially the distribution of the air flow originating from a pressurised air source towards one or the other part of the machine and, on the other hand, distribution means permitting of the differential regulation, in each part, of the relative value of the air flows directed respectively towards the central cushion and towards the peripheral assembly and, accordingly, the relative pressure of each part of the peripheral assembly in relation to the central cushion.

As will be seen more completely hereinunder, the use of the means of concentration and of the means of distribution mentioned above makes it possible to obtain, separately or in combination, variations of the general flight attitude, variations of the stiffness in pitch and roll, variations of the trailing edge reaction at the bottom of the skirts of the peripheral assembly, both for the amplitude and for the point of application of this reaction.

Preferably, the above-mentioned concentration and distribution means consist in swivelling shutters which control an air circulation.

The above-mentioned concentration and distribution means are applicable to any vehicle of the type mentioned in which lift is assured by an internal central cushion with a substantially constant pressure $P_i$ and a partitioned peripheral assembly composed of a plurality of skirts and/or intermediate compartments the pressure $P_j$ of which may vary from one group of skirts to the next (or from one skirt to the next, in the case where the group comprises only one member), the overall operation being in all cases as follows:

for a given centring, and in the absence of an external force, the general attitude variation is obtained by the action of the concentration means by a differential variation of the flow between two or more groups of skirts and the $(P_i/P_j)$ ratio remains appreciably constant;

for a variable centring and/or in the presence of an external force, the general attitude varies with the evolution of the $(P_i/P_j)$ ratio, said ratio being near 1 or greater than 1 (and may reach, for example, 3 or 4) according to the position of the means of distribution which determine in particular the attitude rigidity;

by combining the action of the concentration means and of the distribution means, combined variations of the attitude and of the rigidity are thus obtained.

In other words, on the general rigidity plane, the lift per central cushion and peripheral assembly is found to be assimilatable (relatable) to a spring suspension which would have a large central spring (equivalent to the central cushion of substantially uniform rigidity, and a plurality of peripheral springs (assimilatable to the elements of the peripheral assembly) which would comprise nonuniform rigidities, variable from one element to the next.

Preferably, according to another aspect of the invention, at least one area of the peripheral assembly is constituted by a series of contiguous skirts, at least partly tangential to one another, the supply to these skirts, on the one hand, and to the central cushion, on the other hand, being made in parallel from a diffusion and steadying space which is itself supplied by a source of pressurised air.

As the above-mentioned skirts are arranged in an annular zone surrounding the central cushion, they will be called throughout the following text "annular skirts" for a better understanding.

The present invention proposes various types of machines incorporating one or more of the above features.

It relates also to various types of control of the concentration and distribution shutters. (flaps).

According to a very important feature of the present invention it proposes a combined control means of the various shutters of a machine of the above-mentioned type, in which a single control level is at the disposal of the pilot of the machine to control any pattern of shutters. (flaps).

According to another important feature of the present invention, it recommends various types of subjection of the position of the flaps of various parameters of flight or of operation of the machine.

Moreover, the present invention recommends the addition of an additional flap to the two types of concentration and distribution flaps described in the main patent, as well as its control and servo-control.

The present invention, finally, recommends the employment as a distribution means of a new combined control element (flap or membrane) permitting at one and the same time of the control of the flow proceeding from the source of air to the peripheral assembly, the flow from the source of air to the central cushion, and the communication flow between the peripheral assembly and the central cushion.

The invention will be better understood through the description of the figures of the attached drawings.

On the attached drawings:

FIG. 7 is a diagram showing a control index of one of the flaps of the machine in FIGS. 6 and 6a;

FIG. 7a represents diagrammatically the control panel of the flaps of the machine of FIGS. 6 and 6a;

FIG. 8 represents in top view a machine of elongated general shape, with a particular distribution of skirts and concentration and distribution flaps;

FIG. 8a is a view along the section line A—A of FIG. 8;

FIG. 8b is a view along section line B—B of FIG. 8;

Figures 1A, 1B:
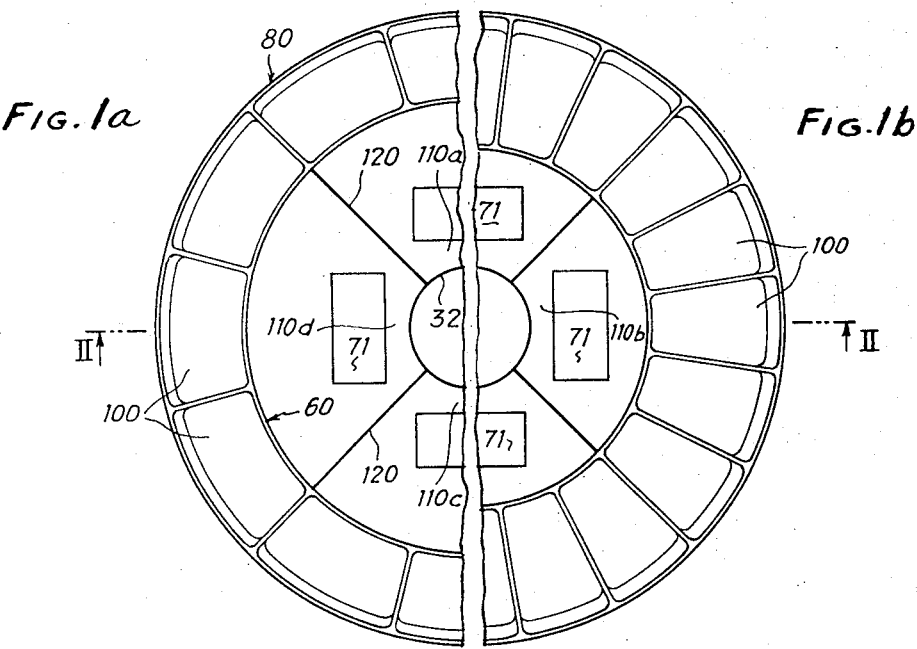
FIG. 1a represents a top view of one half of a round machine provided with contiguous annular skirts over its entire periphery.
FIG. 1b is a view similar to FIG. 1a showing a different type of skirts.
Figure 2:
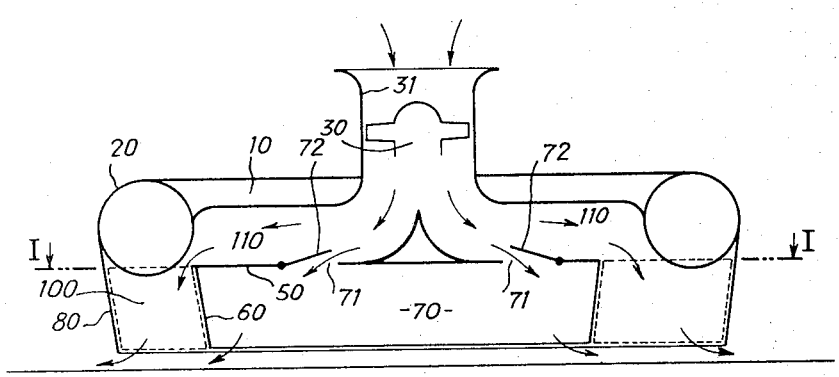
FIG. 2 is a section along the section line II—II of FIG. 1.

The machine of FIGS. 1 and 2 comprises a lift platform 10 delimited on its periphery by a hollow structure 20, for example an air-inflated rubber sausage. Lift is assured by compressed air blow from a fan with a vertical axis housed in a vertical pit 31.

A plate 50 is located under the platform 10. A main internal skirt 60 is associated with the plate 50; it delimits a central cushion 70 capable of being supplied from the fan 30 through openings 71 made in the plate 50, said openings being regulably sealable by distribution flaps 72 or similar devices.

A main external skirt 80 delimits with the main internal skirt 60 a peripheral annular space.

Said annular space comprises a plurality of contiguous annular skirts, which are at least partly tangential to one another and to the main skirts 60 and 80.

The space 110 comprises between the platform 10 and the plate 50 forms a flat level diffusor which acts as a steadying chamber for the air blown by the fan 30; it is from said space that the skirts 100 are supplied. To control such supply, the space 110 is partitioned by radial partitions 120 into various sections, each section forming a steadying chamber and used for the specific supplying of a group of skirts 100. In the example shown, in FIG. 1 there are four evenly distributed sections 110a, 110b, 110c and 110d. Partitions 120 do not necessary extend over the entire height of space 110.

The air blown by the fan 30 is distributed to the various sections through a diffuser system 32. This diffuser system comprises air passage sections which are adjustable to permit of a differentiated supplying of the various sections 110a, 110b, 110c and 110d.

Figure 3:
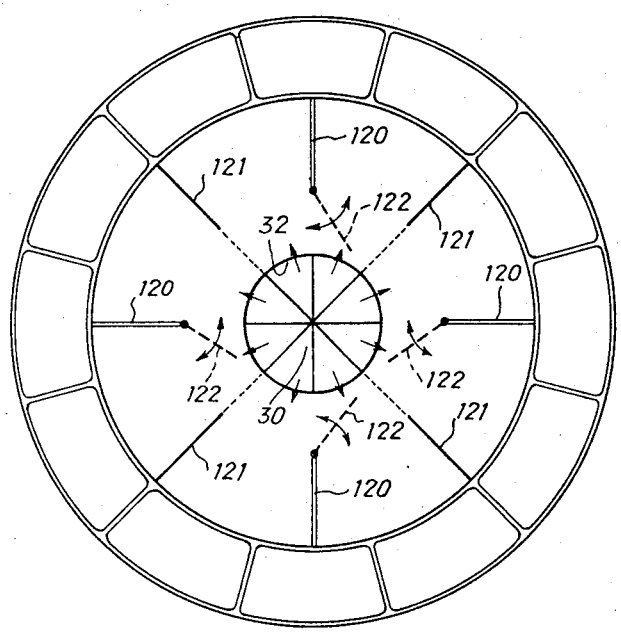
FIG. 3 represents, in a view similar to that of FIG. 1, an alternative of the machine of FIG. 1.

In the alternative represented in FIG. 3. partitions 120 also delimit four sections, each section being divided into two parts by a secondary partition 121. The partitions 120 are provided with swivelling concentration flaps 122 making it possible to achieve a differentiated supply between the various sections of the uniformly blown air on the periphery of the diffuser system 32.

In all cases, the partitioning of the space 110, in combination with the separate supplying of the skirts 100, makes it possible to regulate differentially the pressure and the flow in the different peripheral annular skirts corresponding to the different sections.

It is thus possible to regulate differentially the rigidity at each of the skirts 100, on the periphery of the central cushion. In particular it is possible to regulate relative rigidity between the front and the back of the machine, as well as between the port and starboard sides, which permits of an improvement of the behaviour of the machine in pitch and roll, as will moreover be better understood in connection with FIGS. 4 and 5. Moreover, an asymmetrical pitch rigidity may be obtained, with a considerable rigidity at the rear to prevent scooping and a low rigidity at the front to improve passenger comfort. It is also possible to vary the relative rigidities in pitch and roll. Finally, by concentracting the flow of the fan 30 towards a definite area of the periphery of the machine, it is possible to obtain a differential variation of the height of flight which produces a jet reaction at the bottom of the skirt (in the alternative in FIG. 3, the flaps 122 are shown in a position which concentrates the flow of fan 30 towards the left upper section of the figure). It should also be observed that the distribution flaps 72 also make it possible to regulate the distribution of the air flow arriving at cushion 70 which, by interaction with the flow supplying the annular skirts of the section under consideration, permits of the obtaining of a similar effect. The jet reaction at the bottom of the skirts may be used to advantage as a horizontal control force. The differential variation of the supply of the various groups of annular skirts which is translated by a change of attitude of the vehicle may be selected with a view to an adaptation to the flight and centring conditions.

A description was given above of a skirt assembly 100 and of its method of supply, pointing out that the essential advantage of such arrangements lay in the possibility of regulating rigidity differentially. Means were proposed for a differential supply, section by section. of various groups of skirts. It should be observed that a section does not necessarily correspond with a entire number of skirts (there is an entire number of skirts for each section in the method of embodiment of FIG. 1; there is a non-entire number of skirts per section in the method of execution of FIG. 3). Moreover, there may be as many sections as there are skirts 100, which corresponds to an individual supply of the skirts 100.

According to a subsidiary feature of the invention, it is also possible to vary differentially the height of the skirts.

A description will now be given, in relation to FIGS. 4 and 5, of two particular machine structures.

Figure 4:
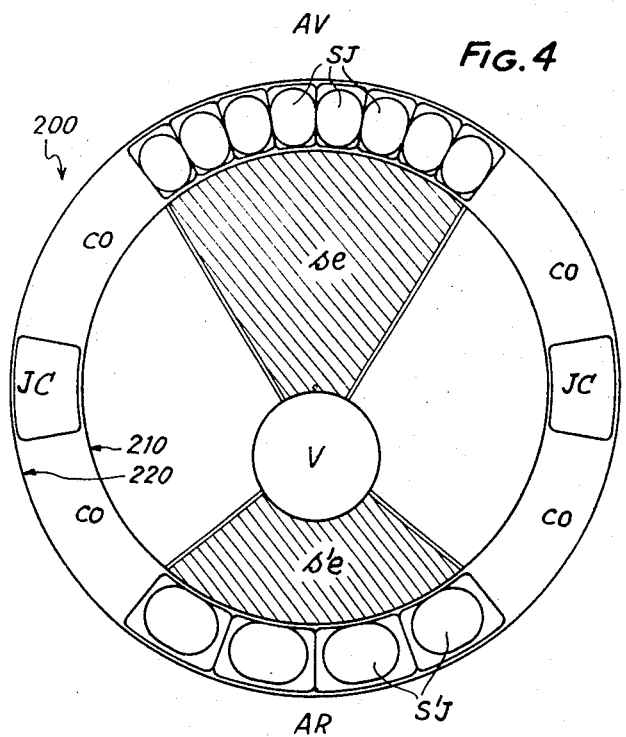
FIG. 4 represents diagrammatically in top view a "mixed" round machine incorporating on its periphery both contiguous annular skirts and standard partition-skirts.

FIG. 4 shows a round machine 200. This machine comprises a central cushion delimited by an internal peripheral skirt 210 and a peripheral assembly delimited by an external peripheral skirt 220.

In characteristic manner, it comprises in this peripheral assembly at the fron and rear of the machine, two sets SJ and S'J of contiguous annular skirts, supplied respectively through two sections $se$ and $s'e$, similar to sections 110$a$, 110$b$, 110$c$ and 110$d$ hereinbefore defined. To the left and right, the peripheral assembly comprises a partition-skirt JC supplied by the leaks of the central cushion, in a manner known per se, and described in particular in French Pat. No. 1,541,013.

For the round machine of FIG. 4, the arrangement adopted serves to increase the pitch rigidity.

Figure 5:
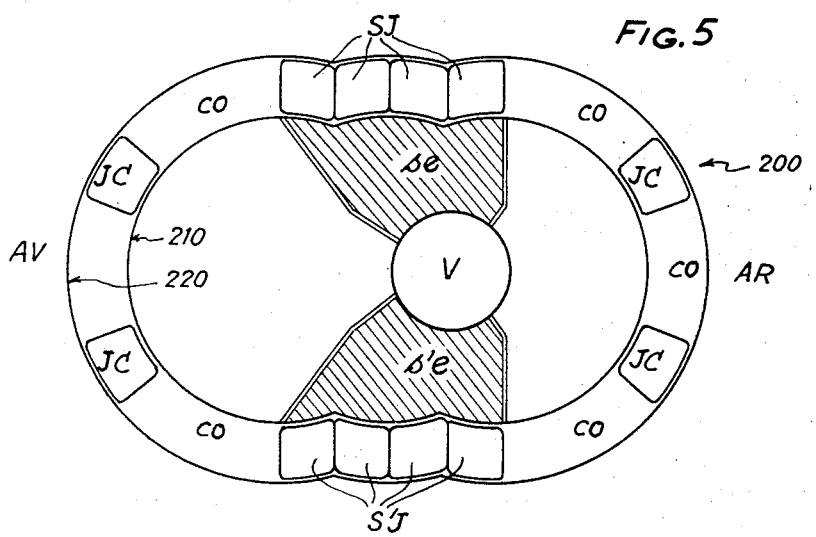
FIG. 5 represents diagrammatically in top view an elongated machine of mixed type.

FIG. 5 represents an elongated machine, the same references having been used as in FIG. 4. It will be seen that the contiguous annular skirts SJ and S'J are then arranged to the left and right of the machine. This arrangement makes it possible to increase the roll rigidity.

It should be observed that the annular skirts which have just been described may be of four different types, according as to whether the lengthening of their top section is made radially or tangentially and according as to whether or not they are tangential to one another over their entire height.

FIGS. 1$a$ and 1$b$ show two different types of skirts. In FIG. 1$a$, the skirts are elongated tangentially, and in FIG. 1$b$ the skirts are elongated radially.

From another angle it should be observed that in the case of skirts 100 placed edge to edge throughout the periphery of the machine, it is possible substantially to reduce the height of the main internal and external skirts. In the case of FIGS. 4 and 5, the main external skirt serves to delimit compartments $co$ which are supplied, in the same way as the skirts JC, from the central cushion.

Figure 6:
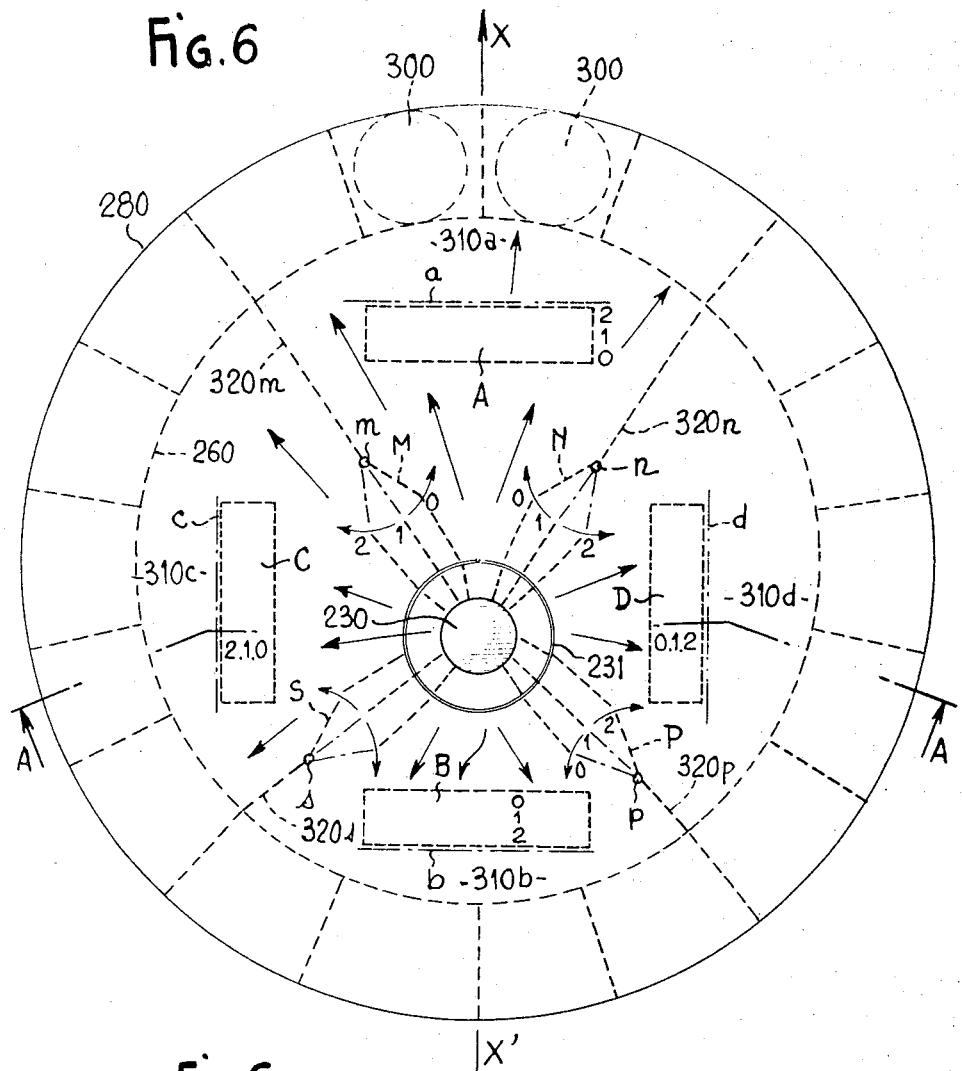
FIG. 6 represents in top view a round machine incorporating a combined arrangement of concentration flaps and of distribution flaps.

The machine of FIGS. 6 and 6$a$ is generally round in shape. It comprises a lift platform 210 delimited on its periphery by a hollow structure 220, for example a hollow rubber sausage. Lift is assured by compressed air blown from a vertical axis fan 230 housed in a vertical pit 231, placed slightly to the rear of the geometrical centre of the platform on the central axis X'—X of movement of the machine (longitudinal axis).

A plate 250 is arranged below the platform 210. A main internal skirt 260 is associated with the plate 250 and delimits a central cushion 270 capable of being supplied from the fan 230 through openings 271 provided in plate 250, said openings being sealable in regulable manner by swivelling flaps A, B, C, D, swivelling being performed around the horizontal hinges $a$, $b$, $c$, $d$. The above-mentioned flaps A, B, C, D constitute the distribution flaps. They may occupy for example three positions: 0 (closed), 1 (semi-opened), 2 (fully opened). The control of said flaps is effected for example by means of hydraulic, pneumatic or electric jacks (not represented) or by similar devices.

A main external skirt 280 delimits with the main internal skirt 260 a peripheral annular space. Said annular space comprises a plurality of contiguous annular skirts 300, partly tangential to one another (and of which two only have been represented in FIG. 1 with a view to simplification).

The assembly of the skirts 260, 280 and 300 constitutes a peripheral annular assembly surrounding the central cushion. Although its arrangement is characteristic, it must be understood that as regards the means of concentration and distribution of the flow from the fan, this peripheral assembly could be replaced by another arrangement of skirts suitably distributed around the central cushion.

The space 310 comprised between the platform 210 and the plate 250 forms a flat diffuser which acts as a steadying chamber for the air blown by the fan 230; it is from that space that the peripheral assembly, and in particular the skirts 300 are supplied with air. For the control of such supply the space 310 is subdivided into various sections by partitions $320_m$, $320_n$, $320_p$ and $320_s$. Each section thus delimited constitutes a diffusion and steadying chamber used for the supply of the group of skirts 300 to which it corresponds.

The partitions $320_m$, $320_n$, $320_p$, $320_s$ include flaps M, N, P, S swivelling around vertical axes m, n, p, s and constituting concentration flaps. Each flap may occupy three positions 0, 1 and 2. For position 1 each flap seals the opening of the partition to which it corresponds, which thus becomes continuous. For position 0, each flap is staggered in a direction in relation to the partition the opening of which is thus unmasked, the flap acting as a deflecting member so that the air may be sent back preferentially into the section opposite the direction of opening of the flap. For position 2, each flap is staggered in the other direction in relation to its partition.

It is clear that the air blown by the fan 230 is distributed to the various sections 310$a$, 310$b$, 310$c$, 310$d$, said distribution being effected differentially according to the position of the concentration flaps M, N, P, S. Similarly, the air thus distributed to each section is distributed differentially between the central cushion 270 and the skirts 300, according to the condition of opening of each of the distribution flaps A, B, C, D.

Finally, it will be observed that the presence of the two types of flaps permits of a very flexible adjustment of the distribution of the air to each group of skirts 300 corresponding to a section, and to the central cushion, the pressure of which remains substantially constant, whatever the centring and the attitude of the machine may be.

The use of distribution flaps makes it possible mainly to vary the relative rigidity of each group of skirts 300 in relation to the rigidity of the central cushion. The term "rigidity" is used here by analogy with the rigidity (stiffness) of a spring; it may be precisely defined as the ratio of a small variation of supporting force to a small variation of a height of flight ($df/dh$).

The use of the concentration flaps makes it possible mainly to vary the general attitude of the machine by differential variation of the height of flight between two or three groups of skirts. This variation of attitude being effected without modifying substantially the ratio ($P_i/P_j$); only the generating pressure in the partition sections of the diffusion and steadying space varies.

By simultaneous action upon the two types of flaps it is possible to obtain any combined variation of rigidity and attitude.

Figure 7:
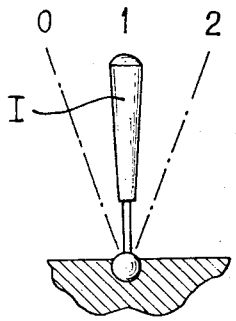

As was said hereinabove, each of the concentration flaps and distribution flaps may be operated with a jack on one of its three positions 0, 1, 2. On the control panel of the machine (FIG. 7) there may be a plurality of control indices I, each corresponding to a flap and being displaceable to three positions 0, 1 and 2 corresponding to the three positions of the flap.

Figure 7A:
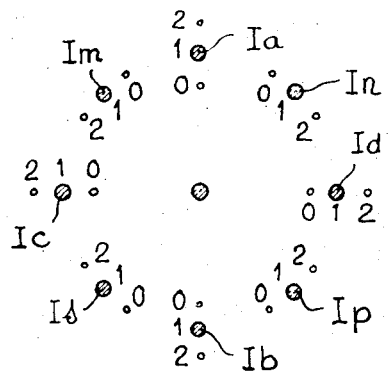

Preferably, then, as shown in FIG. 7a, the assembly of the pointers I$a$, I$b$, I$c$, I$d$, I$m$, I$n$, I$p$ are distributed on the control panel in a homethetic arrangement of the arrangement of the various flaps on the machine.

FIGS. 8, 8a, 8b represent a machine with a generally elongated shape with a longitudinal axis X'—X. Unless otherwise specified, the same references as in FIGS. 1 and 1a have been used to denote homologous elements. The skirts are arranged, as shown, according to four main lobes, i.e. a front lobe $L_a$, a rear lobe $L_r$, a right-hand lobe $L_d$ and a left-hand lobe $L_g$. The inside space 310 is divided by partitions $320_m$, $320_n$, $320_p$, $320_s$ which divide it into four sections from the position of the fan 230 which is located to the rear of the geometric centre of the machine.

A central partition $C_c$ with a plurality of free opening 0 therethrough extends moreover along axis X'—X of the machine, thus subdividing the front and rear sections delimite by the partitions.

The vertical flaps M, N, P, S are mounted as previously facing stationary distributors d which distribute the air blown by the fan 230.

Preferably, the front of the machine comprises three horizontal distribution flaps $A_1$, $A_2$, $A_3$ swivelling about hinges $a_1$, $a_2$, $a_3$, while the size of the flaps increases from the centre to the periphery of the machine for them to control substantially the same output of air, in spite of the reduction of speed of circulation of the air from the centre to the periphery.

Similarly, the gear section comprises two horizontal swivelling distribution flaps $B_1$ and $B_2$, swivelling around axes $b_1$ and $b_2$, the size of said flaps increasing towards the periphery. The lateral sections comprise horizontal distribution flaps $C_1$, $C_2$ and $D_1$, $D_2$ swivelling about axes $c_c$, $c_2$ and $d_1$, $d_2$.

The lateral sections are similarly supplied by distribution flaps $C_1$, $C_2$ and $D_1$, $D_2$, respectively, mounted about horizontal hinges $c_1$, $c_2$ and $d_1$, $d_2$.

Each of the above-mentioned flaps $A_1$, $A_2$, $A_3$, $B_1$, $B_2$, $C_1$, $C_2$, $D_1$, $D_2$ is displaceable to assume as desired one of the three positions 0, 1, 2 as before, under the action of jacks, or similar members, not shown.

Naturally, the part played by the two types of flaps is similar in the case of a round machine and in the case of an elongated machine.

According to a very important feature of the present addition, the assembly of distribution members and concentration members may be controlled by means of a single control member.

Said control member is preferably a control lever at the disposal of the pilot of the machine and capable of being moved in the manner of the joystick of an aeroplane.

Figure 9:
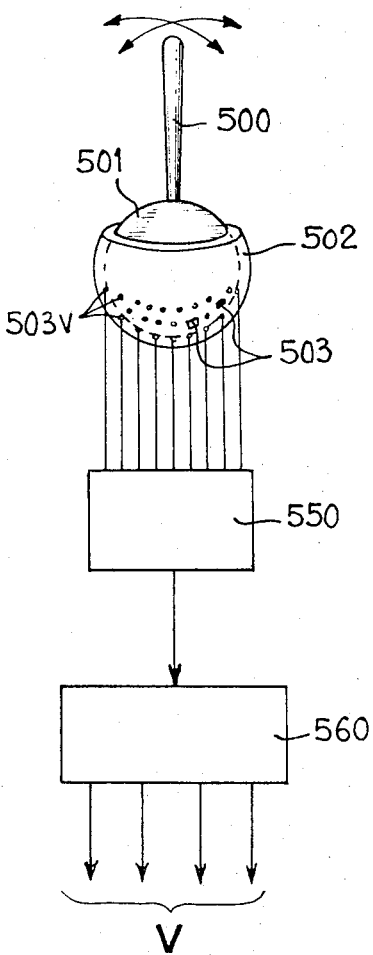
FIG. 9 represents diagrammatically the single control system by means of a control lever placed on the flight deck.

FIG. 9 shows diagrammatically such a method of control.

The sole control lever 500 is integral with a sphere 501 mounted in a spherical housing 502 in which the sphere 501 may move freely (ball mounting). Sphere 502 is provided with two electric contacts 503 capable of cooperating with two sets of fixed electric contacts 503$v$ arranged transversely and longitudinally on the inside wall of housing 502.

Thus, the two contacts 503 of the sphere are always in electric cooperation relation with two of the contacts 503$v$ which give a coded information of the position of the lever. Each contact 503 is connected to an electric potential from a source not shown. The different contacts 503$v$ are joined by a plurality of electric circuits to a decoding element 550 which detects those of the contacts 503$v$ which are at the same potential as the contacts 503, thus having available a datum representative of the position of the lever 500 in space.

In a typical example, there are 49 positions of the lever 500 evenly distributed in space, and corresponding to 49 data originating from two right-angled rows of seven contacts.

The data thus detected by the decoding element 550 are used to control through a dead store with pre-established memory 560, the operation of the various jacks V which actuate the various distribution and concentration members (flaps). By virtue of such a single control the lever 500 makes it possible to change the general lift attitude of the machine correspondingly to the movements of the lever.

This means that when the lever is inclined forward the machine inclines forward (dive attitude), when it is inclined rearwards, the machine is rearwardly inclined (nose up attitude) and when it is inclined to the left or the right the machine follows it in this inclination.

It should be observed that through the pre-established programme, each position of the lever, corresponding to a certain attitude, corresponds also to a certain rigidity.

In such a single control method, the concentration and distribution members may be controlled either discontinuously (going, for example, from position 0 to position 1, then to position 2), or continuously.

In all cases, the position of the concentration and distribution members is slaved, in continuous or discontinuous manner, to the position of the lever.

Naturally, the method of execution of FIG. 9 is only a diagrammatic example of the numerous systems within the reach of the specialist to achieve such a servo-control.

According to another very important feature of the present addition, the position of the concentration and distribution flaps may also be slaved to various flight parameters, it being possible to effect such a servo-control either independently of a single control at the lever of the above-mentioned type, or in combination with such a single control. In the latter case, the position of the flaps depends both upon the position of the lever and upon the value of the flight parameters.

Preferably, the position of the lever determines the mean position of the flaps and the flaps are slaved to move about said mean position as a function of the flight parameters.

In an even more complex control and servo-control type, it is also possible to slave to the various flight parameters the pitch of the lift fan (the variation of the fan pitch being reflected by a variation of the total lift air output).

In the case where several fans are used as a source of compressed air for the supply of different areas of the machine, the differential variation of the pitch of two fans being reflected by a differential variation of their respective outputs, may be used to produce a variation of the general attitude of the apparatus, thus playing the part of means of concentration.

On the technical execution plane, these various servocontrols are within the reach of the specialist as regards the technological means to be used preferentially in each particular case. There will be given hereinunder various examples of servo-control of the concentration and distribution flaps.

In the first place, these flaps may be slaved to the course, or side-slip or drift of the machine. According to the case, use may be made, as detectors forming the inlet to a servo-control line, of either a gyro-compass, or a side-slip vane, or a hydro-dynamic drift detector. The servo-control obtained brings about an automatic stabilisation of the machine in yaw.

Then, the slaving of the flaps and/or the pitch of the fan may be effected as follows:
- to the pressures of the skirts and diffusers (the detectors being for example localised pressure pickups);
- to the vertical accelerations (detected by accelerometers);
- to the speeds (detected either in air, or in water);
- to the variations of the attitude of the machine (detected for example with the aid of gyrometers).

It is thus possible to control the variations of the different pressures in the different areas of the central cushion and of the peripheral assembly, as well as the angular speeds in pitch and roll. It is thus possible to improve the comfort of the passengers, the performances of the vehicle and the behaviour of the skirts.

Figure 6A:
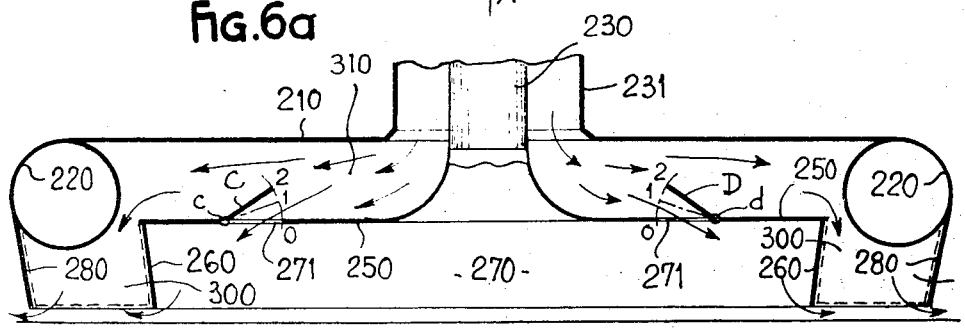
FIG. 6a is a cross-sectional view along section line A—A of FIG. 6.
Figure 10:
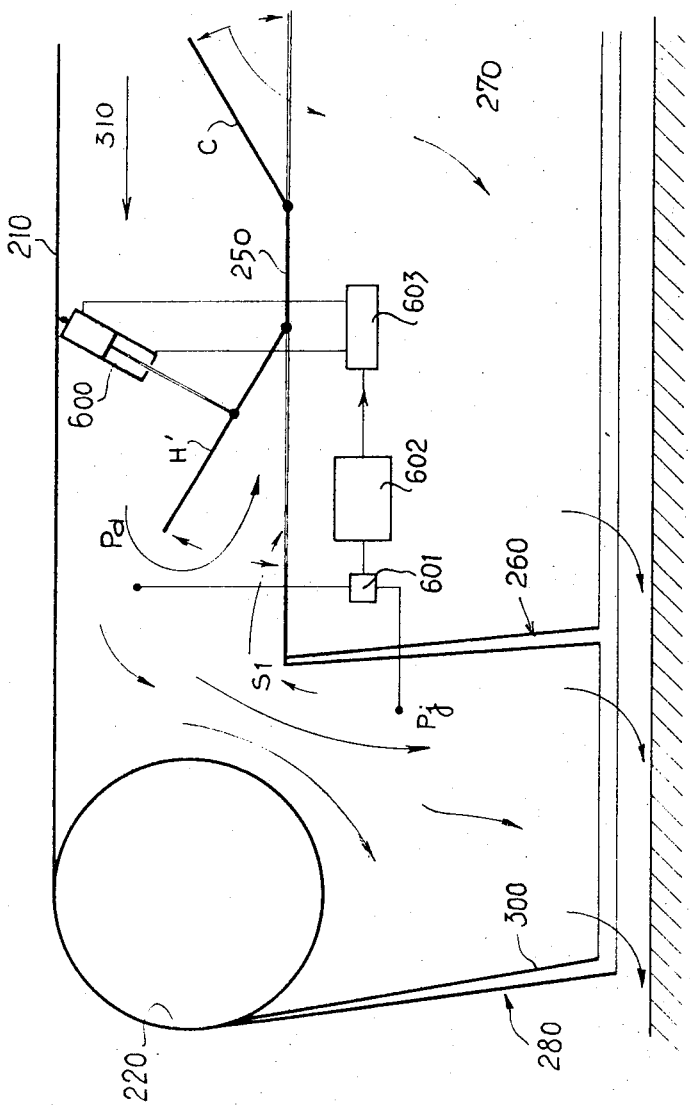
FIG. 10 shows, in partial cross-sectional view similar to that of FIG. 6a, an alternative execution introducing an additional distribution flap.

FIG. 10 illustrates, in a cross-sectional view similar to that of FIG. 6a, an alternative embodiment introducing an additional flap H′, in addition to the distribution and concentration flaps mentioned in connection with FIG. 1 and FIG. 1a.

This flap H′ mounted on plate 250 and swivelling about a hinge h′, under the action of a jack 600, makes it possible to regulate the intercommunication section $S_3$ between the diffusion space 310 on the one hand, and the central cushion 270, on the other hand.

Such a flap H′ is slaved to the difference between the pressures $P_d$ and $P_j$ which are detected respectively in the above-mentioned gap and in the annular skirt 300. On the figure, reference 601 denotes a differential pressure detector, reference 602 a transducer, reference 603 an electro-valve controlled by the electric output of the transducer used for the actuation of the jack 600.

In a machine of the type of FIGS. 6 and 6a, the presence of an additional flap such as H′ makes it possible to improve the efficiency of the control of the overpressures and of the angular speeds.

The directly-actuated flap H′ may also be actuated by a single control member of the above-mentioned type, separately or in combination with the above-mentioned servo-control.

A swivelling flap H′ may be arranged to control the supply to each annular skirt 300. Use may also be made of a same flap H′ to control the supply of several adjacent annular skirts.

Figure 11:
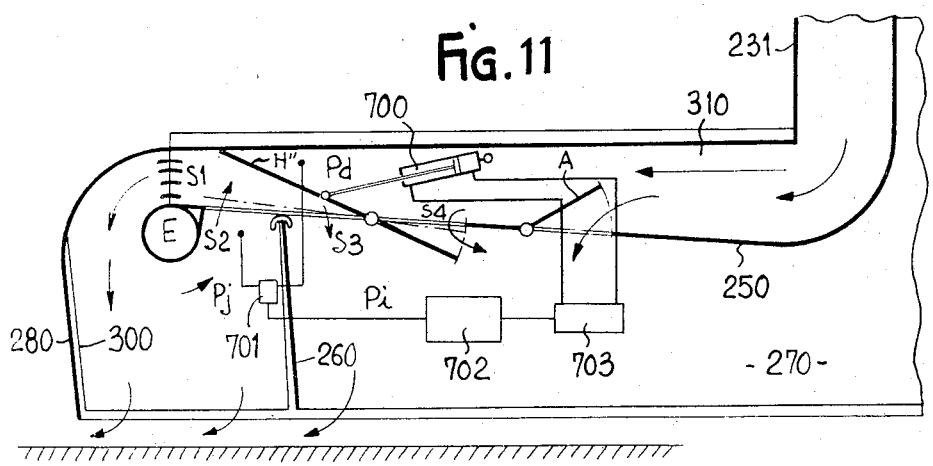
FIGS. 11, 12 and 13 represent diagrammatically views similar to that of FIG. 10, three alternative executions introducing a combined distribution control element.
Figure 12:
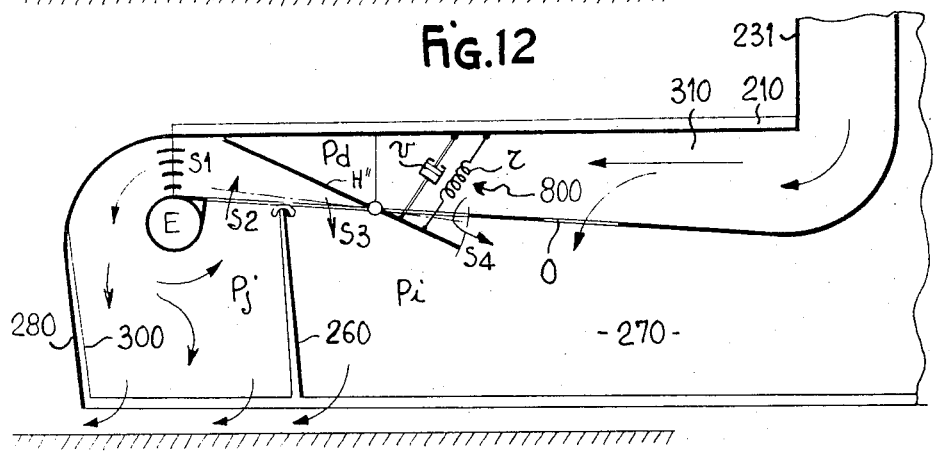
Figure 13:
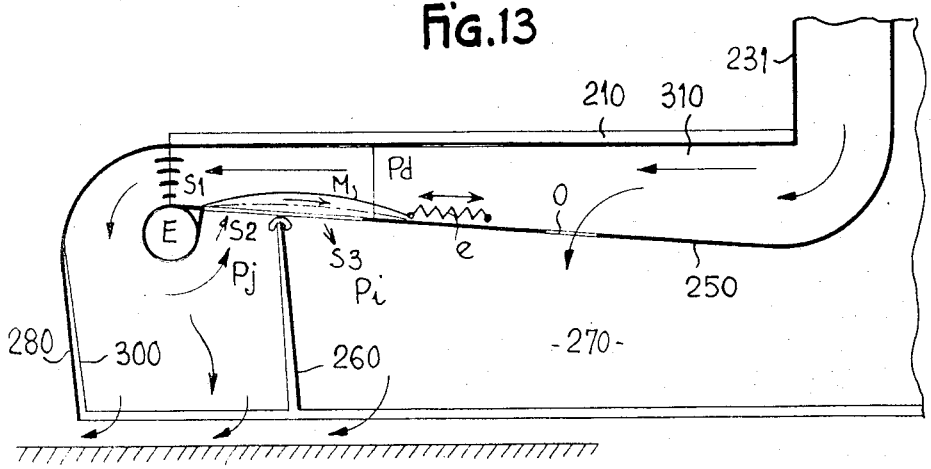

FIGS. 11, 12, 13 show, in partial cross-sectional views, similar to those of FIG. 6a and FIG. 10, other methods of execution of distribution members. On all those figures, the same references have been used as in FIGS. 6a and 10, to denote similar or analogous elements.

According to the particular features of FIGS. 11, 12 and 13, a peripheral annular element E, flexible or rigid, is arranged on the path of the air entering each annular skirt 300 coming from the diffusion and steadying space 310.

Accordingly, there are two passage sections $S_1$ and $S_2$ between said space and the skirts 300.

The methods of execution of FIGS. 11, 12, 13 propose various methods for controlling, separately or in association:
- the passage section $S_1$;
- the passage sections between the annular skirts 300 and the central cushion 270, these sections being formed by the above-mentioned section $S_2$ and by a section $S_3$ constituted by an opening in the floor 250 above the central cushion 270;
- the section $S_4$ between above-mentioned space 310 and the central cushion.

In the method of execution of FIGS. 11 and 12, the simultaneous control of the passage of air through the sections $S_1$, $S_2$, $S_3$, $S_4$ is effected by a flap H″ swivelling about a horizontal axis $h″$.

In the case of FIG. 11, the control of flap H″ is effected by a jack 700 slaved to the difference between the pressures $P_d$ and $P_j$, as described in connection with FIG. 5. On FIG. 11, reference 701 denotes a differential pressure detector, reference 702 a transducer, and reference 703 an electro-valve controlling jack 700.

In the case of FIG. 12, the position of flap H″ is controlled by a compensating assembly with adjustable rigidity 800 which has been represented in symbolical manner as a shock-absorbing jack $v$ associated with a spring $r$.

Figure 14:
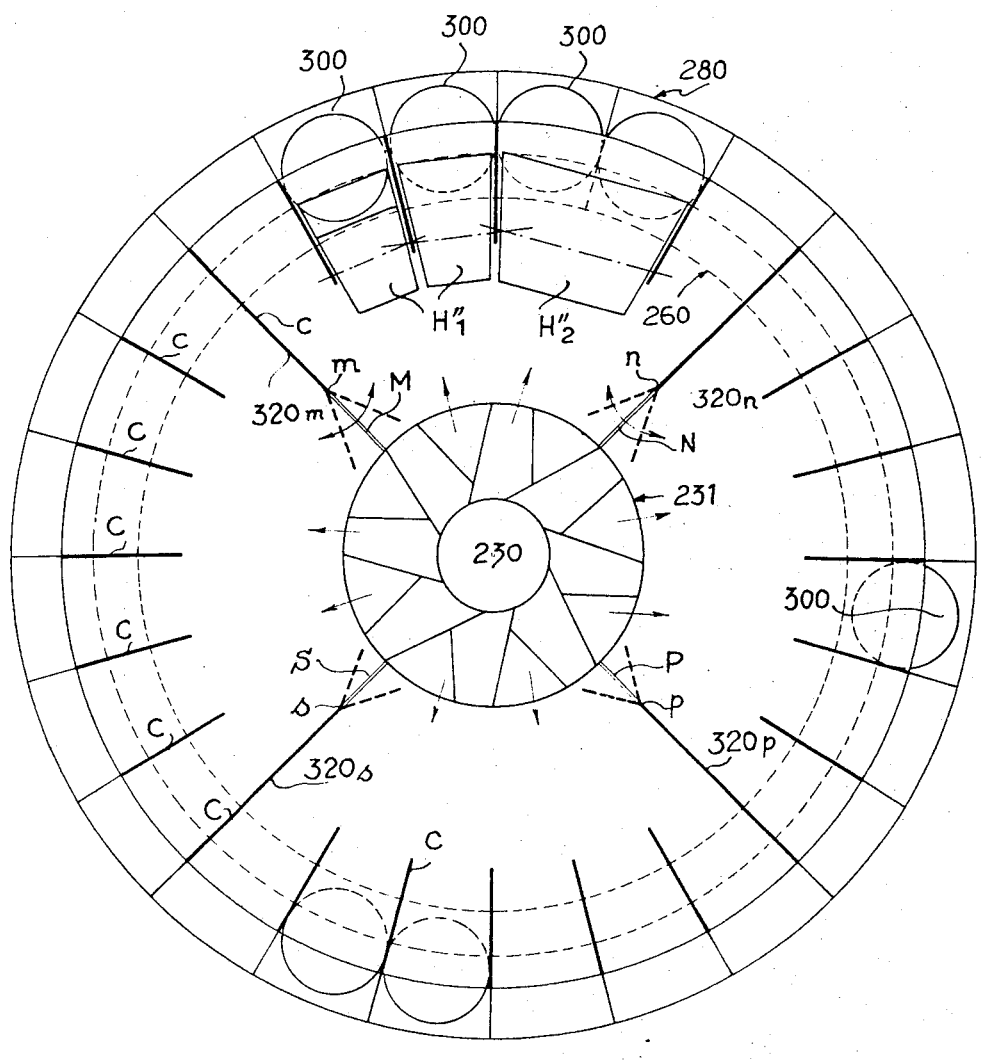
FIG. 14 represents a top view of a round machine fitted with a combined control element of the type of that of FIGS. 10–13.

FIG. 14 shows diagrammatically in top view various possibilities of mounting flaps H″ of the above-described type. They may (as flap H″$_1$) control only the supply to a single skirt 300. They may also (as flap H″$_2$) control the supply to various skirts at the same time simultaneously. Preferably, as shown, baffles $c$ are used in association with the flaps H″ to guide accurately the circulation of air.

It should be noted that the flaps H″ may be used as the only distribution members, and controlled and servocontrolled in the manner hereinbefore described in connection with the concentration flaps of FIGS. 1 and 3.

FIG. 13 shows an alternative in which the flaps H″ are replaced by a resiliently-deformable membrane M, elastic means $e$ always tending to apply said membrane against the above-mentioned sections $S_2$ and $S_3$.

As was indicated in connection with the flaps H″, a membrane M may operate in connection with one or more annular skirts 300.

We claim:
1. An air cushion vehicle, comprising:
    an impermeable platform,
    at least one source of compressed air coupled to the platform,
    an external skirt depending from the platform,
    an internal skirt,
    a plurality of annular skirts coupling the internal skirt to the external skirt for providing a peripheral lift assembly,
    an impermeable plate peripherally supported by the internal skirt below the platform for providing in combination with the internal skirt a volume below the plate and for providing between the plate and platform a diffusion space for coupling compressed air to the peripheral lift assembly, a plurality of partitions extending towards the peripheral assembly in the diffusion space for subdividing the diffusion space into a plurality of sections, concentration means in the diffusion space for controlling the relative amounts of air flowing into each of the plurality of sections, and distribution means for dividing the air flowing into said sections between the peripheral assembly and the volume, whereby the concentration and distribution means control the lift created by air flowing into the peripheral assembly and the lift provided by a central air cushion created in the volume.

2. An air cushion vehicle as defined in claim 1 wherein said concentration means include a plurality of flaps, each of the flaps being pivotally coupled to a different one of the partitions so that each flap is movable between the sections on each side of the partition to which it is coupled.

3. An air cushion vehicle as defined in claim 1 wherein said distribution means include a number of openings in the plate and a number of flaps pivotally coupled to the plate, each of the flaps cooperating with one of the openings.

4. An air cushion vehicle as defined in claim 1 wherein a series of said annular skirts are arranged tangentially along the periphery of one of the sections.

5. An air cushion vehicle as defined in claim 1 wherein the annular skirts are tangent to the internal and external skirts.

6. An air cushion vehicle according to claim 1, wherein four distribution sections are provided, i.e. a front section, a rear section and two side sections.

7. An air cushion vehicle according to claim 6, characterised in that the vehicle is of round shape, in that the source of air is arranged slightly to the rear of the geometric centre of the vehicle and in that the distribution means comprise a horizontal pivoting flap for each section.

8. An air cushion vehicle according to claim 6, characterised in that the vehicle is of elongated shape, in that the source of air is arranged at the rear of the geometric centre of the vehicle, and in that the distribution means comprise several horizontal pivoting flaps for each section.

9. An air cushion vehicle according to claim 8, characterised in that each of the side sections comprise several flaps arranged substantially at an equal distance from the longitudinal axis of the vehicle and in that each of the front and rear sections comprises several flaps arranged in succession at different distance from the transversal axis of the vehicle passing through the source of air.

10. An air cushion vehicle according to claim 5, characterised in that it comprises two groups of annular skirts arranged in two separate areas of the peripheral assembly.

11. An air cushion vehicle according to claim 10, characterised in that its general shape is round and in that the two groups of annular skirts are respectively arranged at the front and rear of the machine.

12. An air cushion vehicle according to claim 10, characterised in that its general shape is elongated and in that the two groups of annular skirts are respectively arranged to port and starboard.

13. An air cushion vehicle according to claim 1, characterised in that the position of the means of concentration and means of distribution is at least partly slaved to the value of a flight parameter.

14. An air cushion vehicle according to claim 1, characterised in that the distribution means comprise swivelling flaps locally controlling intercommunication between the diffusion space and the central cushion, and slaved to the difference of pressure prevailing locally between the peripheral assembly and the diffusion space.

15. An air cushion vehicle according to claim 1, characterised in that the distribution means are constituted by swivelling flaps controlling locally the intercommunication sections between the diffusion space and the peripheral assembly, between the diffusion space and the central cushion and between the peripheral assembly and the control cushion.

16. An air cushion vehicle according to claim 1 characterised in that the concentration means comprise resiliently deformable membranes locally controlling intercommunication between the peripheral assembly and the central cushion, always tending to sever this intercommunication.

17. An air cushion vehicle of the type comprising a platform the lift of which is assured, from at least one source of compressed air, by a central lift air cushion surrounded by a partitioned peripheral lift assembly, characterized in that the supply from the air source, to the central cushion, on the one hand, and to the peripheral assembly, on the other hand, is effected through a diffusion space provided below the platform, in that said diffusion space is at least in part subdivided according to a plurality of sections by partitions extending in the direction of the peripheral assembly, in that concentration means are provided for adjusting differentially the air flow sent to the various sections, in that distribution means are provided to regulate differentially the distribution of the air of each section to the peripheral assembly and to the central cushion and, consequently, the relative pressure, in each section, of the peripheral assembly in relation to the central cushion, each of the concentration and distribution means being controlled individually through a particular control member, the assembly of control members being regrouped on the control panel in an arrangement reproducing the arrangement of the various means on the vehicle.

18. An air cushion vehicle of the type comprising a platform the lift of which is assured, from at least one source of compressed air, by a central lift air cushion surrounded by a partitioned peripheral lift assembly, characterized in that the supply from the air source, to the central cushion, on the one hand, and to the peripheral assembly, on the other hand, is effected through a diffusion space provided below the platform, in that said diffusion space is at least in part subdivided according to a plurality of sections by partitons extending in the direction of the peripheral assembly, in that concentration means are provided for adjusting differentially the air flow sent to the various sections, in that distribution means are provided to regulate differentially the distribution of the air of each section to the peripheral assembly and to the central cushion and, consequently, the relative pressure, in each section, of the peripheral assembly in relation to the central cushion, the various means of concentration and distribution being controlled by a movable single control lever the position of which is in each case representative of the attitude of the vehicle.

19. An air cushion vehicle according to claim 18, characterised in that the control is effected from the lever through a decoding and pre-established programme memory system effecting the correspondance of a predetermined rigidity to each position of the attitude.

* * * * *